United States Patent [19]

Thomas

[11] Patent Number: 4,785,686
[45] Date of Patent: Nov. 22, 1988

[54] CABLE MOUNTS

[75] Inventor: Robert M. Thomas, S. Lyon, Mich.

[73] Assignee: American Motors Corporation, Southfield, Mich.

[21] Appl. No.: 913,969

[22] Filed: Oct. 1, 1986

[51] Int. Cl.$^4$ .............................................. F16C 1/10
[52] U.S. Cl. ................................ 74/502.4; 74/502.6
[58] Field of Search ............ 74/501 R, 501 D, 501 A, 74/501 F, 513, 502, 566; 188/2 D, 24; 248/56, 27.3, 288.3; 16/2; 403/316, 197; 174/153 G; 411/107, 104, 103, 108, 111, 112, 131, 175, 182; 285/162

[56] References Cited

U.S. PATENT DOCUMENTS

| | | | |
|---|---|---|---|
| 1,876,731 | 9/1932 | Neate | 74/501 D |
| 1,936,191 | 11/1933 | Evans | 188/2 D X |
| 2,034,219 | 3/1936 | Williams | 74/502 |
| 2,454,659 | 11/1948 | Leonard . | |
| 2,592,949 | 4/1952 | Philipson | 74/501 F |
| 2,975,653 | 3/1961 | Morse | 74/501 D |
| 3,038,730 | 6/1962 | Bentley | 74/473 P |
| 3,101,205 | 8/1963 | Benham | 188/2 D |
| 3,205,727 | 9/1965 | Sevrence | 74/501 R |
| 3,240,502 | 3/1966 | Snyder | 248/56 |
| 3,244,802 | 4/1966 | Sturtevant et al. | 16/2 X |
| 3,380,318 | 4/1968 | Henning | 464/174 X |
| 4,173,157 | 11/1979 | Miller et al. | 74/501 A |
| 4,238,974 | 12/1980 | Fawcett | 74/501 R |
| 4,362,138 | 12/1982 | Krueger et al. . | |
| 4,397,276 | 8/1983 | Hayashida . | |
| 4,406,177 | 9/1983 | Bennett et al. | 74/501 D |
| 4,534,239 | 8/1985 | Heimann | 74/501 D |
| 4,541,302 | 9/1985 | Yamamoto et al. | 74/501 D |
| 4,543,932 | 10/1985 | Sturdy . | |

FOREIGN PATENT DOCUMENTS

| | | | |
|---|---|---|---|
| 670987 | 1/1939 | Fed. Rep. of Germany | 74/501 C |
| 1022850 | 1/1958 | Fed. Rep. of Germany | 74/502 |
| 2237301 | 3/1973 | Fed. Rep. of Germany | 74/513 |
| 1410294 | 7/1964 | France | 74/502 |
| 362067 | 8/1938 | Italy | 74/501 D |
| 58-12831 | 1/1983 | Japan | 74/501 D |
| 267408 | 3/1950 | Switzerland | 74/502 |
| 978314 | 12/1964 | United Kingdom | 74/501 D |
| 2040383 | 8/1980 | United Kingdom | 74/501 D |

*Primary Examiner*—Gary L. Smith
*Assistant Examiner*—Rodney M. Lindsey
*Attorney, Agent, or Firm*—Brooks & Kushman

[57] ABSTRACT

A cable mount comprises a tubular body having a radially enlarged flange and retaining fingers axially spaced from and inclined toward the enlarged flange adapted to retain the mount within an apertured panel. The cable mount also includes an axial extension including one part of a two-piece ball and socket connection. A second piece of the ball and socket connection is provided on a cable accessory such as a tubular sheath which can therefore be swivelly mounted with respect to the cable mount. Another cable accessory comprises a barrier cap which covers the opening in the apertured panel and a registering opening in any trim material covering the panel. In addition, an integral cable assembly according to the present invention includes a pair of cable mounts and any mating cable accessories such as sheaths or barrier caps, and these components are entrained between the ends of the cable by an enlarged terminus at each end of the cable.

4 Claims, 1 Drawing Sheet

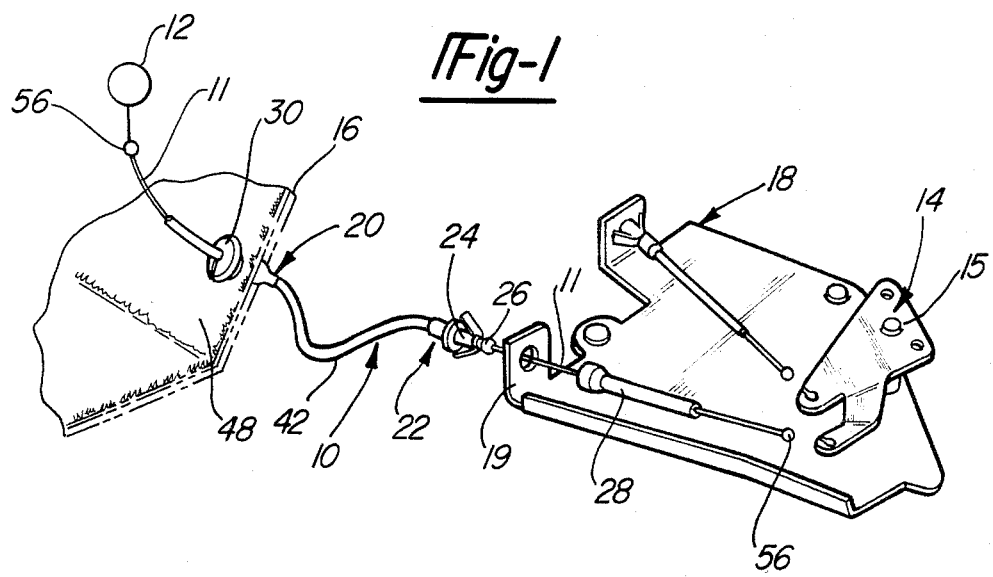
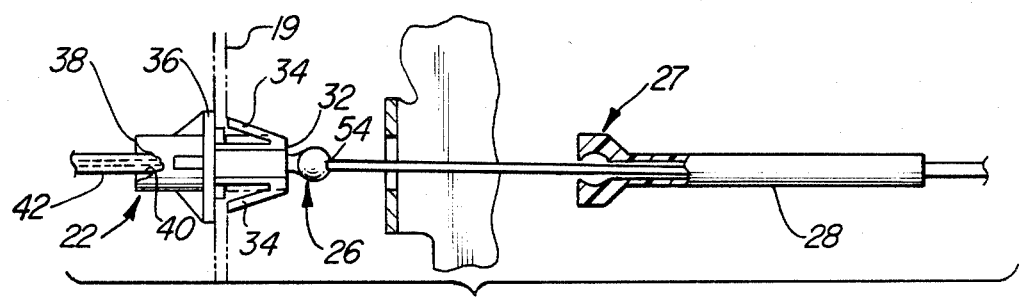
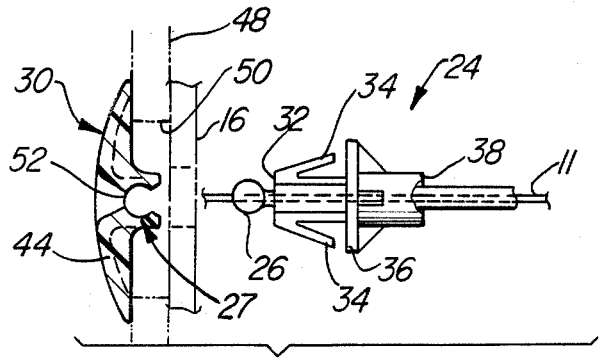
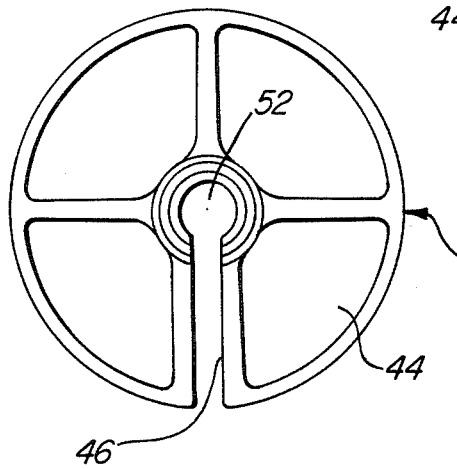

4,785,686

CABLE MOUNTS

BACKGROUND OF THE INVENTION

I. Field of the Present Invention

The present invention relates generally to supports for flexible cables, and more particularly to such supports a displaceable throttle cable in an apertured panel.

II. Description of the Prior Art

Cables are a well known form of a connecting link used for actuating mechanical apparatus. For example, a throttle cable may be used to control the induction of air and fuel to an internal combustion engine. The use of a cable is advantageous for the reason that it is flexible and can be routed in a convenient manner between the accelerator pedal assembly mounted in a vehicle passenger compartment and the induction apparatus of the engine within the engine compartment. In a typical throttle cable setup, the cable may pass through an aperture in a support bracket so that it is positioned for proper alignment with the operating mechanism connected at the end of the cable. In addition, the cable must pass through the dash panel of the vehicle to the throttle control mechanism operable from the passenger compartment.

In order to avoid abrasion of the cable and the restriction of movement of the cable due to contact with the peripheral edge of the aperture, a cable mount bushing having a central bore adapted to receive the cable therethrough is entrained within the aperture. The means for entraining the bushing in the aperture is often separately constructed from the bushing itself and thus substantially increases the cost and labor involved in installing the throttle cable.

Moreover, additional control or protection of the cable at a position spaced apart from the cable mount is often desired. Thus, some previously known cable mounts have included elongated extensions such as a tubular sheath secured to the cable mount in order to cover a portion of the cable extending beyond the cable mount. However, such previously known tubular sheaths can substantially restrict displacement of the cable due to the rigid connection of the sheath with the fixedly mounted cable mounting bushing. Such restriction can affect the ability of the throttle mechanism to meet the throttle closing time required by federal specifications.

Moreover, it may be appreciated that the opening in a dash panel which permits entry of the throttle cable perforates the barrier between the engine compartment and the passenger compartment of the motor vehicle. Consequently, noise and heated air can be transmitted through the opening and interfere with a passenger's comfort within the motor vehicle. In addition, it may be appreciated that any trim such as carpeting which is laid against the dash panel must also be perforated in order to permit entry of the cable. Cutting of the carpeting often leaves frayed edges or fibers which can interfere with the cable operation or produce fiberous or other particulate debris which accumulates and promotes moisture retention and eventual corrosion of the cable.

SUMMARY OF THE PRESENT INVENTION

The present invention overcomes the above-mentioned disadvantages by providing a cable mount which entrains itself within an apertured panel upon installation and which includes an integral extension adapted to swivelly support an accessory member. The accessory member may be in the form of a sheath having a mating swivel connection component which couples to the extension on the cable mount. In addition, the accessory member may also be in the form of a cap which forms a barrier about the opening in the panel and the opening in any trim adjacent the panel. The present invention also provides a completed cable assembly in which two cable mounts adapted to hold each type of connecting member are entrained on the cable for ease of installation.

A cable mount constructed in accordance with the present invention comprise a tubular body adapted to be inserted through the aperture in the panel and including a radially enlarged flange larger than the aperture and adapted to abut against the panel. Self-locking means for retaining the cable mount within the aperture, for example, radially outwardly biased, deflectable fingers axially spaced from but extending toward the radially enlarged flange, lock the panel between the expanded flange and the fingers. In addition, the tubular body includes an axial extension through which the cable extends and including means for detachably connecting the mount to an accessory member. In the preferred embodiment, the axial extension comprises one part of the two-piece ball and socket connector.

One form of accessory adapted to be coupled to the mount comprises an elongated tubular sheath. Preferably, a ball and socket connector means for swivelly connecting the sheath to the cable mount permits the sheath to adjust to changing alignments of the cable throughout its operation without unduly restricting displacement of the cable as can occur with rigid or merely flexible sheaths.

Another form of connectable accessory comprises a barrier cap which provides a finished appearance over an opening through which the cable extends in a panel or an adjacent trim piece. Moreover, the barrier provides protection against the cable coming in contact with or being subjected to debris such as loose fibers which may extend around an opening in carpet laid against the dash panel. The barrier cap includes an opening which is adapted to register with the opening in the axial extension and preferably includes an elongated slit extending from the opening to the outer peripheral edge of a radially extended body of the barrier cap. Thus, the cap can be easily installed on the side of the panel opposite to the side from which the cable mount has been inserted.

In addition, a cable assembly including cable mounts and connectable accessories can be assembled as a unit for easy installation when the cable is to be supported so as to extend through spaced, apertured panels. It may be appreciated that the term "panels" as used herein includes bracket flanges, body panels and other structures having an aperture through which a cable is to be extended. In particular, cable mounts can be positioned on the cable before an enlarged terminus, which is typically utilized for engaging the actuating or actuated element with an end of the cable, is formed on each end of the cable. Thus, each terminus can be used to retain the cable mounts and accessory components on the cable during transport and storage so that the parts are conveniently available for installation. Such a cable structure is especially advantageous for use in mass production of motor vehicles.

Thus, the present invention provides cable mounts which are readily connectable to cable accessories. In addtion the present invention provides cable accessories and a complete cable assembly including cable mounts and connectable accessories. Moreover, the two-piece ball and socket connection used in the preferred embodiment not only permits detachable securement of a cable accessory to the cable mount but also permits a wide degree of swivel displacement for the accessory member so that the connected accessory can be aligned as necessary. Furthermore, the cable can be easily installed in a desired alignment without restricting movement of the cable and without restricting alignment of the cable as it is displaced in conjunction with the actuator or actuated element. These and other advantages will described in greater detail in the following detailed description.

BRIEF SUMMARY OF THE DRAWING

The present invention will be more clearly understood by reference to the following detailed description of a preferred embodiment when read in conjunction with the accompanying drawing in which like reference characters refer to like parts throughout the views and in which:

FIG. 1 is a perspective view of a throttle cable installation incorporating the cable FIG. 2 is an enlarged, partly exploded front view of a cable mount and accessory component constructed in accordance with the present invention;

FIG. 3 is a further enlarged, partly exploded front view of a cable mount and another accessory component constructed in accordance with the present invention; and FIG. 4 is a side view of the accessory component shown in FIG. 3.

DETAILED DESCRIPTION OF A PREFERRED EMBODIMENT

Referring first to FIG. 1, a throttle cable assembly 10 includes a cable 11 adapted to connect a throttle actuator diagrammatically indicated at 12 with a throttle lever as indicated at 14. Since the throttle actuator 12 is within the passenger compartment of the motor vehicle so as to be accessible to the driver, the cable must extend through the dash panel 16. The other end of the cable extends through an aperture in a flange 19 of the support bracket 18 for accurately aligning the cable with respect to the throttle lever 14. The cable assembly 10 also includes cable mounts 20 and 22 of substantially the same construction which are slidably entrained on the cable 11 so as to support the cable 11 in the apertures of the dash panel 16 and the support bracket 18 respectively.

Each cable mount 20 and 22 includes a tubular body 24 defining a central bore adapted to slidably receive the cable 11 therethrough. As best shown in FIGS. 2 and 3, each tubular body 24 includes two diametrically opposed retaining fingers 34 unitarily formed with and resiliently biased to extend radially outwardly from the tubular body 24 at a position axially spaced from a radially enlarged flange 36. The flange 36 is larger than the aperture to receive the tubular body 24 so as to abut against the panel containing the aperture. The fingers 34 extend toward the flange 36 so that their free ends are normally maintained at a position radially outward from the body and beyond the periphery of the aperture in the apertured panel. The end 32 of the tubular body 24 at which the fingers 34 are secured to the body 24 is dimensioned to fit within the aperture in the panel. However, the fingers 34 can be deflected radially inwardly by the periphery of the aperture in the apertured panel and then resiliently urged outwardly to the position shown in solid line in FIG. 2 when the radially enlarged flange 36 on the tubular body 24 abuts against the panel. Thus, the cable mount 22 becomes standard within the aperture in the bracket 18 as the flange 19 of the bracket 18 is entrained between the retaining fingers 34 and the radially enlarged flange 36. Similarly, the cable mount 24 becomes mounted in the dash panel 16.

One end 38 of the tubular body 24 includes an increased diameter bore portion 40 adapted to receive a flexible sheath protector 42 covering the cable 11 intermediate the cable mounts 20 and 22. In addition, each tubular body 24 includes an axial extension 26 having a bore in registering communication with the central bore of the tubular body 24 and configured to form a ball portion of a ball and socket connection. A mating socket housing 27 is provided on an accessory member such as the tubular sheath 28 or the barrier cap 30.

Referring now to FIG. 2, the tubular sheath 28 is made of a resiliently deformable material and dimensioned to slidably receive the cable 11 therethrough. The sheath 28 forms a protective layer about the cable 11 intermediate the bracket flange 19 and the throttle lever 14. Preferably, the perimeter of the tubular sheath 28 and its socket housing portion 27 are appropriately sized to fit within the aperture in the bracket flange 19 so that the tubular sheath 28 can be preassembled with the cable assembly 10. Nevertheless, it may also be appreciated that the tubular sheath 28 can also be attached to the cable mount 22 after the cable mount 22 has been installed within the support bracket 18 and before the end of the cable is secured to the throttle lever 14, provided that the bore of the tubular sheath is dimensioned to receive any enlarged terminus at the end of cable 11.

Referring now to FIG. 3, the cable mount 20 is also shown comprising a tubular body 24 having substantially the same features as the cable mount 22. The barrier cap 30 includes a socket housing 27 disposed at the center of a radially expanded body 44. A central opening extending through the barrier cap is positioned for registering communication with the central bore in the cable mount 20. An elongated slit 46 extends between the central opening and the periphery of the radially expanded body 44 so that the barrier cap 30 can easily be slid into position over the cable 11 and pressed onto the axial extension 26 extending through the aperture in the dash panel 16.

Referring again to FIG. 1, it can seen that the barrier cap 30 is particularly well adapted to prevent the transmission of noise and air through the dash panel aperture once the cable mount 20 has been installed in the dash panel 16. Moreover, while the interior side of the dash panel is often covered by carpet as shown at 48 in FIG. 1, and the carpet 48 must also be cut to include an opening through which the cable 11 can pass, the opening 50 (FIG. 3) is often formed in the carpet before the carpet is actually laid within the passenger compartment. As a result, the opening 50 is oftentimes much larger than the opening in the dash panel so that it is able to register with the opening in the dash panel despite differences in the manner in which the carpeting is laid within the passenger compartment. Thus, the barrier cap also serves to provide a finished appearance to the interior of the vehicle body by covering any rough edges or excessive opening cut into the carpet 48. Moreover, the barrier cap 30 also prevents frayed edges of the carpet or loose carpet fibers coming in contact with the cable 11.

Moreover, the opening in the barrier cap 30 can be particularly configured as shown at 52 to form a wiper which coaxially engages the cable 11 to prevent the introduction of dust and other debris into the openings or the cable mount in a manner in which can adversely affect sliding displacement of the cable 11 through the cable mount 20. Similar wiper configurations may be employed in the ball-shaped extensions 26 as shown at 54 in FIG. 2.

As is also shown in FIG. 1, the cable mounts of the present invention also provide a swivel connection for the tubular sheath 28 so as to avoid undesirable restriction of changes in cable alignment which occur during operational displacement of the cable as shown in phantom line at FIG. 1. Moreover, as the lever 14 pivots about the pin 15, the socket housing 27 swivels about the ball-shaped extension 26 to freely orient the tubular sheath 23 with the cable 11. Since the tubular sheath 28 is flexible, any bending or curving of the cable 11 throughout the range of movement of the cable is easily accommodated by the sheath 28. Nevertheless, the cable 11 remains protected from debris and environmental conditions by the tubular sheath.

In constructing an integral cable assembly 10 which is especially advantageous for installation in the mass production of motor vehicles, each of the cable mounts 20 and 22 can be installed on a cable 11 so as to extend in opposite directions. These cable mounts can then be entrained upon the cable 11 by securing an enlarged terminus 56 at each end of the cable 11. An enlarged terminus is often used to connect the cable to the actuating or actuated elements, and is a well known structure. However, in the present invention such termini serve as an appropriate means for entraining the cable mounts, as well as sheathing and any other accessory components on the cable 11. The wipers 54 are also useful for preventing removal of the cable mounts 20 and 22 from the cable 11 when a terminus 56 is applied at each end. Such an integral structure can be simply and conveniently installed during assembly of a motor vehicle.

Thus, the present invention provides cable mounts which are particularly adapted to permit the connection of cable accessories with a cable assembly. The present invention also provides a novel swivel connection for a cable sheath and a novel barrier cap which provides a trim function as well as an insulation function in the passenger compartment of the vehicle. Furthermore, the present invention provides an entire cable assembly which can be pre-assembled prior to delivery to an assembly operation where the throttle cable is to be installed in a motor vehicle. Such pre-assembly assures that all necessary components will be available at the time of installation and substantially reduces the need for supplying, transporting and consolidating the numerous components normally required to construct the throttle cable assembly.

Having thus described the present invention, many modifications thereto will become apparent to those skilled in the art to which it pertains without departing from the scope and spirit of the present invention as defined in the appended claims.

What is claimed is:

1. A cable mount for guiding a cable through an aperture in a panel comprising:
    a tubular body defining a bore dimensioned to slidably receive the cable therethrough, said body including means for entraining said tubular body within the aperture in the panel;
    an axial extension unitarily formed on said tubular body including a first part of a two-piece ball and socket connection, dimensioned to be insertable through the aperture in the panel;
    a mating member including a second part of said two piece ball and socket connection and including an opening in registering communication with said bore in said tubular body; and
    wherein said mating member comprises a cover having an expanded body radially dimensioned to extend outwardly beyond the periphery of the aperture in the panel to cover the aperture in the panel.

2. The invention as defined in claim 1 wherein said cover includes an elongated slit extending from said opening to a peripheral edge of said expanded body.

3. A throttle cable assembly adapted to be supported by spaced, apertured support panels comprising:
    an elongated cable;
    first and second cable mounts, each said mount comprising a tubular sleeve defining a central bore dimensioned to slidably receive said cable therethrough, said sleeve including means for retaining said cable mount within the aperture of one of said panels;
    each of said first and second cable mounts including an axial extension with a bore extension in registering communication with said central bore, said axial extension being dimensioned to be received through said panel aperture, and including one piece of a two-piece ball and socket connection, and
    wherein each said bore extension includes a reduced diameter bore portion forming a wiper in coaxial engagement with said cable;
    a first mating member including a second piece of said ball and socket connection;
    a second mating member including a second piece of said ball and socket connection;
    means for entraining said first and second cable mounts on said cable consisting essentially of an enlarged terminus at each end of said cable; and
    wherein at least one of said first and second mating members comprises a cover having a radially expanded body extending radially outwardly from the periphery of the aperture in one of the support panels to cover the aperture in the panel, and having an opening in registering communication with said bore extension.

4. The invention as defined in claim 3 wherein said cover includes an elongated slit extending from said opening to a peripheral edge of said body.

* * * * *

UNITED STATES PATENT AND TRADEMARK OFFICE
CERTIFICATE OF CORRECTION

PATENT NO. : 4,785,686

DATED : November 22, 1988

INVENTOR(S) : ROBERT M. THOMAS

It is certified that error appears in the above-identified patent and that said Letters Patent is hereby corrected as shown below:

<u>IN THE SPECIFICATION:</u>

| | |
|---|---|
| Column 1, lines 7 and 8 | After "supports" insert --in the form of bushings adapted to support--. |
| Column 2, line 12 | "comprise" should be --comprises--. |
| Column 3, line 25 | After "cable" (second occurrence) insert --mounts according to the present invention ; --. |

UNITED STATES PATENT AND TRADEMARK OFFICE
CERTIFICATE OF CORRECTION

PATENT NO. : 4,785,686

DATED : November 22, 1988

INVENTOR(S) : ROBERT M. THOMAS

It is certified that error appears in the above-identified patent and that said Letters Patent is hereby corrected as shown below:

Column 4, line 6            "standard" should be --entrained--.

Signed and Sealed this

Twenty-first Day of March, 1989

Attest:

DONALD J. QUIGG

*Attesting Officer*        *Commissioner of Patents and Trademarks*